United States Patent
Hove et al.

(10) Patent No.: US 11,662,059 B2
(45) Date of Patent: May 30, 2023

(54) LUBRICANT DISPENSER FOR A WIND TURBINE

(71) Applicant: Siemens Gamesa Renewable Energy A/S, Brande (DK)

(72) Inventors: Thomas Hove, Gentofte (DK); Ulrich Hedegaard Madsen, Børkop (DK)

(73) Assignee: Siemens Gamesa Renewable Energy A/S

(*) Notice: Subject to any disclaimer, the term of this patent is extended or adjusted under 35 U.S.C. 154(b) by 409 days.

(21) Appl. No.: 15/931,957

(22) Filed: May 14, 2020

(65) Prior Publication Data

US 2020/0362830 A1    Nov. 19, 2020

(30) Foreign Application Priority Data

May 16, 2019    (EP) .................................. 19174869.8

(51) Int. Cl.
  *F16N 19/00*    (2006.01)
(52) U.S. Cl.
  CPC ........ *F16N 19/00* (2013.01); *F05B 2240/221* (2013.01); *F05B 2240/50* (2013.01);
  (Continued)
(58) Field of Classification Search
  CPC .... F16N 19/00; F16N 2210/025; F16N 13/08; F16N 37/003; F16N 2013/003;
  (Continued)

(56) References Cited

U.S. PATENT DOCUMENTS

| | | |
|---|---|---|
| 3,494,509 A | 2/1970 | Mcguire |
| 5,271,528 A | 12/1993 | Chien |
| 2016/0369782 A1 | 12/2016 | Lee |

FOREIGN PATENT DOCUMENTS

| | | |
|---|---|---|
| CN | 201772242 U | 3/2011 |
| CN | 204283754 U | 4/2015 |

(Continued)

OTHER PUBLICATIONS

European Search Report dated Nov. 19, 2019 for Application No. 19174869.8.

*Primary Examiner* — Hung Q Nguyen
(74) *Attorney, Agent, or Firm* — Schmeiser, Olsen & Watts LLP (57) ABSTRACT

A lubricant dispenser for filling a lubricant reservoir of a wind turbine is provided. The lubricant dispenser includes a carrier configured to receive a lubricant container, wherein the carrier includes at least a first and second support for supporting a first and second end of the lubricant container and. The lubricant dispenser further includes a flow connection having a first end configured to be coupled to the lubricant container and a second end configured to be coupled to the lubricant reservoir, and a squeeze mechanism that is mechanically coupled to the second support and that is actuatable to move the second support towards the first support such that a lubricant container disposed between the first and second supports is squeezed, whereby the content of the lubricant container is discharged through the flow connection. A wind turbine lubrication system and method of refilling a wind turbine lubricant reservoir are provided.

17 Claims, 5 Drawing Sheets

(52) U.S. Cl.
CPC ....... *F05B 2240/57* (2013.01); *F05B 2260/98* (2013.01); *F05B 2270/606* (2013.01); *F16N 2210/025* (2013.01)

(58) Field of Classification Search
CPC ........... F05B 2260/98; F05B 2270/606; Y02E 10/72; F03D 80/70; F03D 80/00
See application file for complete search history.

(56) References Cited

FOREIGN PATENT DOCUMENTS

| | | | |
|---|---|---|---|
| CN | 108591795 A | 9/2018 | |
| DE | 102008038580 A1 | 2/2010 | |
| DE | 202018101471 U1 * | 7/2018 | |
| GB | 2500118 A | 9/2013 | |
| JP | H08210591 A | 8/1996 | |
| WO | WO-2010077282 A1 * | 7/2010 | .......... F16C 33/6662 |
| WO | 2015099384 A1 | 7/2015 | |

* cited by examiner

LUBRICANT DISPENSER FOR A WIND TURBINE

CROSS-REFERENCE TO RELATED APPLICATIONS

This application claims priority to EP Application No.19174869.8, having a filing date of May 16, 2019, the entire contents of which are hereby incorporated by reference.

FIELD OF TECHNOLOGY

The following relates to a lubricant dispenser for filling a lubricant reservoir of a wind turbine and to a wind turbine lubrication system. The following further relates to a method of refilling a wind turbine lubricant reservoir.

BACKGROUND

Wind turbines have several components that require lubrication. Among them are for example the main bearing of the wind turbine and pitch bearings of the mechanism that adjusts the pitch angle of the rotor plates. In particular for offshore wind turbines, such bearings cannot be manually greased on a regular basis, as the costs of on-site services are prohibitively high. Accordingly, such bearings are equipped with a lubrication system that includes a lubricant reservoir which is filled with lubricant and which ensures that the bearings are continuously lubricated over an extended period of time. During the regular onsite service, the technician has to refill the lubricant reservoir.

Refilling generally occurs by means of lubricant containers, which are often provided in the form of bellows cartridges. Conventionally, an external pump, often termed refiller pump, is used to pump the lubricant, in particular grease, from the cartridge into the lubricant reservoir. The capacity of such pump is limited, and it will take a significant amount of time to refill the reservoir, as several cartridges need to be pumped into the reservoir.

It is desirable to make this time- and cost-intensive refilling procedure more efficient. It is further desirable to facilitate the refilling and to make the equipment required for refilling less complex.

SUMMARY

An aspect relates to mitigate at least some of the drawbacks mentioned above and to improve the refilling of a lubricant reservoir of a wind turbine. An aspect further relates to reduce the time required for refilling such lubricant reservoir.

According to an embodiment of the present invention, a lubricant dispenser for filling a lubricant reservoir of a wind turbine is provided. The lubricant dispenser comprises a carrier configured to receive a lubricant container. The carrier comprises at least a first support for supporting one end of the lubricant container and a second support for supporting a second (opposite) end of the lubricant container. It further includes a flow connection having a first end configured to be coupled to the lubricant container and a second end configured to be coupled to the lubricant reservoir. The lubricant dispenser further comprises a squeeze mechanism that is mechanically coupled to the second support and that is actuatable to move the second support towards the first support. The squeeze mechanism is configured such that if a lubricant container is disposed between the first and second supports, movement of the second support leads to the squeezing of the lubricant container so that the content of the lubricant container is discharged through the flow connection.

By such lubricant dispenser, a fast and efficient transfer of the lubricant from the container to the lubricant reservoir becomes possible. In particular, by squeezing the lubricant container, the lubricant can be transfer faster compared to a pumping of the lubricant. The lubricant may for example be grease.

The configuration of the lubricant dispenser is such that at least 50% of the volume of lubricant comprised in the lubricant container is discharged with a single actuation of the squeeze mechanism (provided that a full lubricant container is inserted). At least 70% or at least 80% of the volume of lubricant is discharged with a single actuation of the squeeze mechanism.

The squeeze mechanism may comprise a manual actuator, an electric actuator, a hydraulic actuator or a pneumatic actuator, the respective actuator being configured to effect the movement of the second support. The squeeze mechanism is manually actuatable by means of the manual actuator. In such configuration, the complexity of the lubricant dispenser can be reduced, and no connection to an electric, hydraulic or pneumatic power supply is required.

In an embodiment, the squeeze mechanism comprises an extended state in which the second support is spaced apart by a predetermined distance from the first support to allow the insertion of the lubricant container. The squeeze mechanism further comprises a contracted state in which the second support is spaced apart from the first support by less than half the predetermined distance. The squeeze mechanism is configured to bring the second support from the extended state to the contracted state with a single stroke of the actuator. A fast and efficient discharging of the content of the lubricant container can thereby be achieved. The whole content of the lubricant container may thus be discharged with a single stroke or single actuation of the squeeze mechanism. It should be clear that the term 'whole content' refers to the content that is dischargeable by mechanical actuation from the container, and that a certain amount of lubricant will always remain inside the container even in the most compressed state of the container.

As an example, a single stroke or a single actuation of the manual actuator (for example a lever arm), of a hydraulic or pneumatic cylinder, or of a linear electrical actuator can bring the squeeze mechanism from the extended into the contracted state. In the contracted state, the second support may be spaced apart from the first support by even less than a third or less than a quarter of the predetermined distance. The contracted state is a most contracted state in which the second support is as close to the first support as allowed by the mechanical configuration of the squeeze mechanism and/or the minimal extension of the lubricant container compressed between the supports. The lubricant container can thus be fully discharged with a single actuator stroke.

The manual actuator may comprise a lever arm that has a first end for actuation and a second end coupled to the second support. The lever arm can be pivotably coupled to a frame of the lubricant dispenser at a pivot point. The pivot point is closer to the second end than to the first end of the lever arm. Such configuration ensures that sufficient force can be applied manually to the second support to discharge the content of the lubricant container. In particular, grease is generally quite viscous, so that a relatively high force may need to be applied to the second support, which can be achieved by the respective lever arm. It is certainly also conceivable that the second end of the lever arm is coupled to the frame and the pivot point is coupled to the second support. A similar lever force can be applied to the second support this way.

The second end of the lever arm may be connected to the second support by a linkage element that is pivotably coupled to the second end of the lever arm and to the second support. Such linkage element may allow the second support to perform a linear motion towards the first support when the manual actuator is actuated, while the lever arm pivots around the respective pivot point.

Some embodiments may comprise one or more lever arms, the lever arms being provided with a handle or grip at their first end.

In a preferred embodiment, the squeeze mechanism comprises two of such lever arms which are coupled to opposite sides of the second support. The first ends of the two lever arms can be interconnected by a handle. In such configuration, by pulling the handle, both lever arms can be actuated simultaneously, thus applying a significant force to the second support so that the lubricant container can be squeezed together fast and efficiently to discharge the lubricant.

The second support may be provided in form of a plate that is configured to support the outer shell of the lubricant container. The configuration of the second support may in particular be such that when the container is squeezed by movement of the second support, the outer shell of the lubricant container is squeezed. The plate may for example be sized so as to receive the end of the lubricant container that has a predetermined maximum outer diameter of its outer shell. The second support may in particular be sized so as to be larger than the maximum outer diameter of the container shell and to thereby support the outer shell of the lubricant container. The plate may for example comprises grooves or ridges for aiding the positioning of a container of a predetermined size, or of multiple containers of different sizes up to the maximum size on the second support.

The lubricant dispenser may have two or more guiding rods, and the second support may have cutouts through which these guiding rods extend. Movement of the second support may be guided by such guiding rods. For example, four guiding rods may be provided for guiding the plate of the second support at its four corners. The lubricant dispenser can include a further plate to which the guiding rods are mounted (for example bolted) and which further supports the flow connection. The pivot point of the lever arm can be mounted to such further plate, for example to a lug attached to the plate.

The first support may comprise an end of the flow connection and a connector configured to connect an opening of the lubricant container to the end of the flow connection. The first support may also comprise an adapter piece configured to be connected (in particular screwed) to the lubricant container and to be coupled to the flow connection. The end of the flow connection or the adapter piece may for example include a flange which is configured to abut against a neck of the container. The container may have a screw neck, and the end of the flow connection or the adapter piece may be provided with a sleeve nut or compression nut which is adapted to be screwed onto such screw neck. In other configurations, the adapter piece may include a recess with an internal thread which is configured to receive a screw neck of the lubricant container. The other side of such adapter piece may for example be a cylindrical element that is adapted to be slid over the end of the flow connection. It may in particular be configured to establish a tight fit with the end of the flow connection, and it may include one or more sealing rings to provide a sealing to the end of the flow connection.

In an embodiment, the lubricant dispenser comprises a frame including a first plate, in particular an upper plate, and two or more downwardly extending guiding rods. The first support may form part of the upper plate or may be supported by the upper plate. The flow connection is led through the upper plate such that the end of the flow connection that is to be coupled to the lubricant container is disposed below the upper plate. Movement of the second support is guided by the guiding rods. The second support may in particular be moveable by the squeeze mechanism in an upward direction and towards the first support. As the end of the flow connection is disposed below the upper plate, contamination of the end of the flow connection by dirt particles can be prevented. In particular, no dirt can fall onto the inlet to the flow connection. The lubrication of the wind turbine bearings is particularly sensible to dirt, as dirt particles can be devastating to the bearing and eventually cause failure of the whole wind turbine.

It is also possible to provide the first plate as a lower plate from which the guiding rods extend upwards. Such configuration is particularly beneficial if the lubricant dispenser is to be disposed or mounted directly above the reservoir so that lubricant can be discharged from the lubricant container downwards through the first plate into the reservoir.

The terms upward and downward or below have the conventional meaning herein, they refer to the vertical direction with respect to the earth's surface.

The flow connection can be a conduit, in particular a pipe, a tube or the like. The flow connection may also be provided by a hole in a frame or in the first support of the lubricant dispenser, for example in the above mentioned first plate.

For example, the lubricant dispenser may include a frame having a first plate that includes the flow connection as a hole through the plate, wherein one end of the flow connection is connectable, for example via a connector or adapter piece, to the lubricant reservoir and the other end of the flow connection is connectable, for example via a connector or adapter piece, to the reservoir or to a lubricant pump coupled to the reservoir. In the simplest form, there may be a simple screw connection between one end of the flow connection and the reservoir and the lubricant container may be screwed onto the other end of the flow connection, e.g. into a hole in the plate or onto a conduit.

In some embodiments, the lubricant dispenser may be a portable lubricant dispenser. The lubricant dispenser may be configured to be carried by a service technician. The service technician may bring the lubricant dispenser into the nacelle of the wind turbine and connect the flow connection to the lubricant reservoir to be refilled.

In other embodiments, the lubricant dispenser is mounted in a fixed spatial relationship to the reservoir to be refilled; it may in particular be mounted inside the nacelle. In any case, the reservoir can be filled fast and efficiently with lubricant by operation of the lubricant dispenser.

The reservoir may be the reservoir of a main bearing lubrication system, a blade pitch bearing lubrication system, a yaw bearing lubrication system or a combined lubrication system that lubricates two or more components of the wind turbine. It should be clear that the lubricant dispenser can be used for refilling any type of lubrication system of the wind turbine. Further, lubricant from the reservoir may be employed for lubricating plural different wind turbine components. The volume of the reservoir is generally larger than the volume of the lubricant container to be used with the lubricant dispenser. It may for example be at least 5 times or at least 8 times larger. Yet the lubricant dispenser may also be used for refilling lubricant reservoirs that have a smaller volume.

According to a further embodiment of the present invention, a wind turbine lubrication system is provided that comprises a lubricant reservoir for storing lubricant. The reservoir is configured to be disposed in a nacelle of the wind turbine. The wind turbine lubrication system further comprises a lubricant dispenser that can have any of the configurations described above and further below. The lubricant dispenser is mounted in a fixed spatial relationship to the lubricant reservoir. It may for example be mounted to the reservoir.

The lubrication system may also include a lubricant pump configured to pump lubricant from the reservoir to one or more wind turbine components to be lubricated, such as bearings, gears, rack and pinion and the like. The lubricant dispenser may be mounted to such lubricant pump, e.g. besides or on top of the pump. The reservoir may further be mounted to the lubricant pump, e.g. on top of the pump or besides the pump, respectively.

Such configurations facilitate the refilling of the lubricant reservoir. In particular, a service technician does not need to carry additional equipment, such as refiller pumps or the like, for refilling the reservoir. It is sufficient for the service technician to insert the lubricant container, such as a grease cartridge, into the dispenser that is fixed to the reservoir or to the lubricant pump and to actuate the dispenser to thereby discharge the whole amount of lubricant into the reservoir. The lubricant dispenser is in particular permanently mounted to the lubricant reservoir or the lubricant pump, i.e. it is not intended to be removed after refilling the reservoir. The dispenser may for example be mounted to the lubricant reservoir or to the lubricant pump by means of bolts, welding, clamping or the like, or a combination thereof.

In an example, the lubricant dispenser is mounted to the reservoir such that the opening of the lubricant container (through which the lubricant is discharged) faces upwards when inserted into the dispenser.

In another example, the lubricant dispenser is mounted to the reservoir such that the opening of the lubricant container faces downwards when inserted into the dispenser. The lubricant dispenser may for example be mounted to the reservoir such that the opening of the lubricant container is located directly above an inlet opening of the reservoir that is provided for refilling the reservoir. The content of the lubricant container can then be discharged directly into the reservoir, which reduces the flow resistance of the lubricant and facilitates the discharging. The inlet opening can for example be on the top of the reservoir, and the lubricant dispenser can be mounted to the top of the reservoir.

The lubricant reservoir may be the lubricant reservoir of a wind turbine main bearing lubrication system, of a wind turbine blade pitch bearing lubrication system, of a wind turbine yaw bearing lubrication system or any other lubrication system of the wind turbine. Such lubrication systems need to be provided with a significant amount of lubricant during refilling, which can take several hours for a service technician using conventional means for refilling. By means of embodiments of the present invention, less than ⅕, or even 1/10 of the time may be required to perform the refilling. This is a significant improvement over conventional refilling systems.

The wind turbine lubrication system may comprise the lubricant container. The lubricant container can be a bellows shaped cartridge that has a bellows shaped outer shell. The squeeze mechanism may be configured to squeeze together the outer shell of the lubricant container. The content of the lubricant container may thus be discharged in a fast and efficient way.

According to a further embodiment, a wind turbine comprising a wind turbine lubrication system in any of the configurations described herein is provided. The wind turbine may comprise a nacelle, and the lubricant reservoir and the lubricant dispenser can both be mounted inside the nacelle in a fixed spatial relationship. As mentioned above, the lubricant dispenser can be mounted directly to the reservoir or to the lubricant pump, or it may be mounted to another part of the nacelle, e.g. a wall or structure thereof.

The wind turbine can comprise the main bearing, the blade pitch bearing and/or the yaw bearing. It should be clear that one, two or more components of the wind turbine may be lubricated by the lubrication system.

According to a further embodiment of the present invention, a method of refilling a wind turbine lubricant reservoir is provided. The method comprises the steps of disposing a lubricant container in the carrier of a lubricant dispenser having any of the above described configurations, and the actuating of the squeeze mechanism of the lubricant dispenser to discharge the content of the lubricant container, in particular substantially the whole dischargeable content of the lubricant container, through the flow connection into the lubricant reservoir. With such method, advantages similar to the ones outlined further above may be achieved.

In particular, actuating the squeeze mechanism may comprise a single manual actuation of a respective manual actuator, such as the lever arm mentioned above, to discharge substantially the whole amount of lubricant of the lubricant container. It should be clear that in general, some lubricant will remain in the lubricant container, as the lubricant container can be compressed to only a certain degree and as some lubricant will remain in the area of the container's neck.

It is to be understood that the features mentioned above and those yet to be explained below can be used not only in the respective combinations indicated, but also in other combinations or in isolation, without leaving the scope of embodiments of the present invention.

BRIEF DESCRIPTION OF THE DRAWINGS

Some of the embodiments will be described in detail, with reference to the following figures, wherein like designations denote like members, wherein.

DETAILED DESCRIPTION

In the following, embodiments of the invention will be described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the art.

Figure 1:
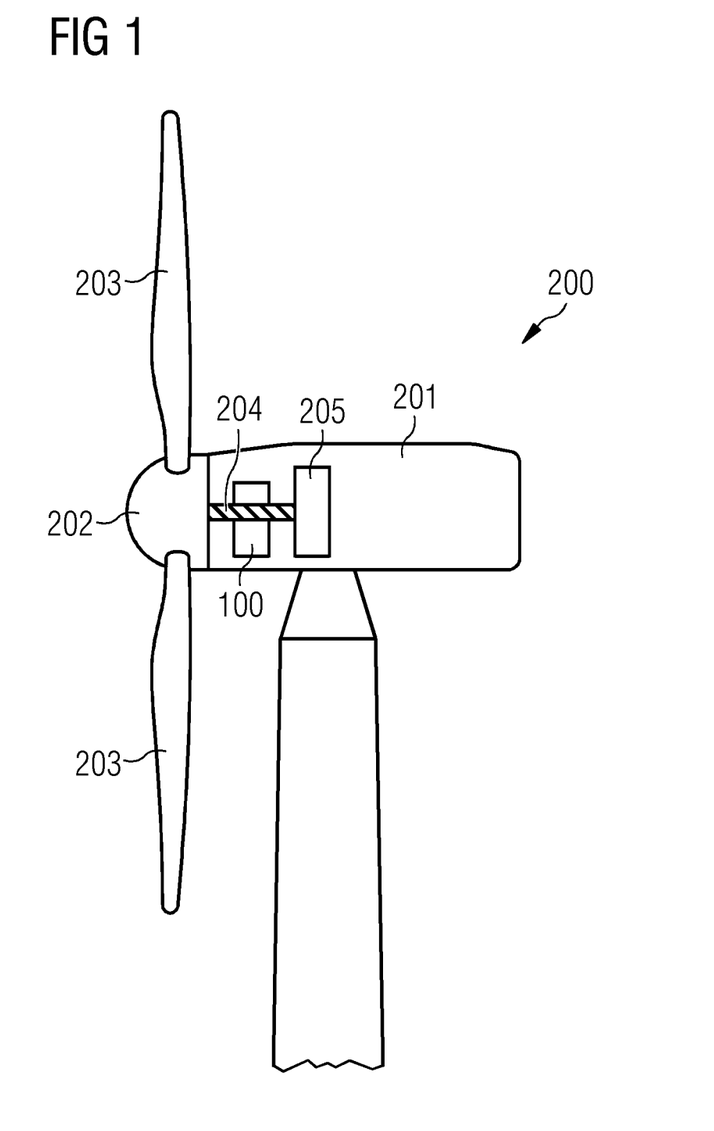
FIG. 1 is a schematic drawing showing a wind turbine according an embodiment of the invention.

FIG. 1 schematically illustrates wind turbine 200 comprising a nacelle 201 to which a rotor 202 is mounted. Rotor 202 includes rotor blades 203, the pitch angle of which can be adjusted by using a pitch drive. The rotor 202 is coupled to a main shaft 204 by means of which torque is transferred to the generator 205. A gear box (not shown) may be provided on the main shaft between the rotor and the generator. The bearings of the main shaft, of the pitching mechanism, as well as bearings of other components have to be lubricated. For this purpose, lubrication system 100 is provided in the nacelle 201. In FIG. 1, the lubrication system 100 is provided for lubricating the main shaft, but respective lubrication systems can be provided for other components of the wind turbine, such as for the bearings of the blade pitching mechanism.

Figure 2:
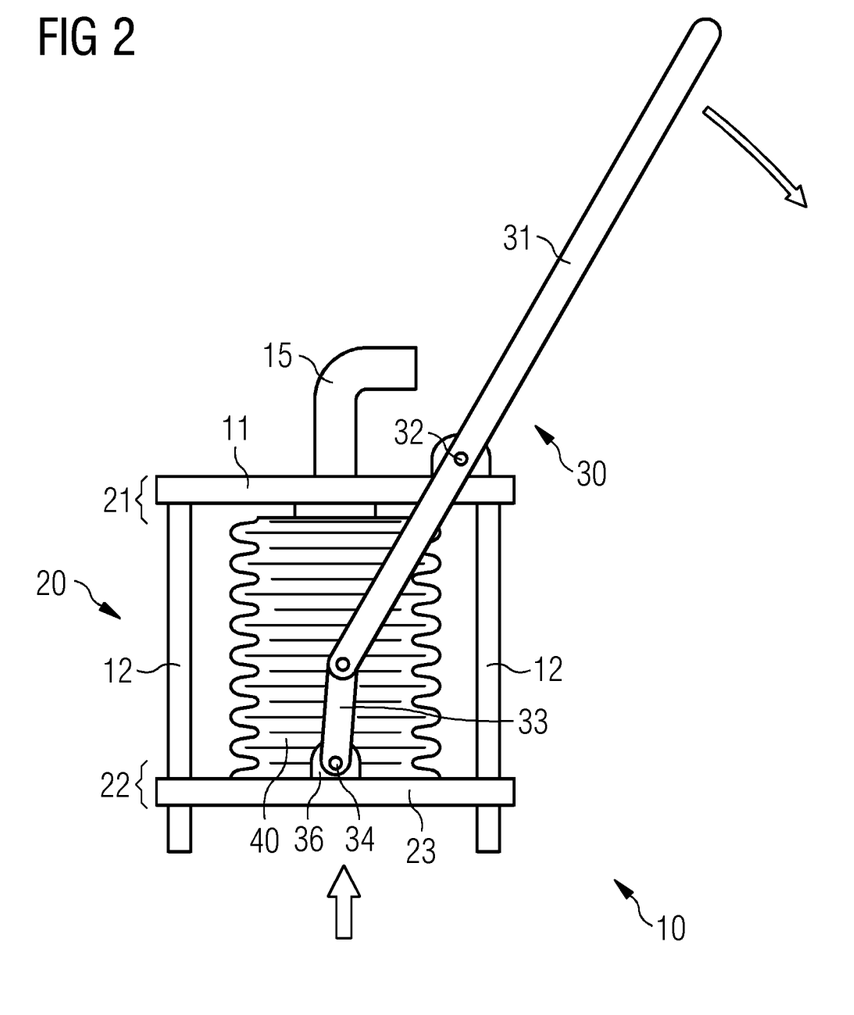
FIG. 2 is a schematic drawing showing a lubricant dispenser according to an embodiment of the invention.

FIG. 2 schematically illustrates a lubricant dispenser 10 that can be used with such lubrication system 100. The lubricant dispenser 10 includes a frame comprising a top plate 11 and guiding rods 12 are mounted to top plate 11 and that extend downwardly therefrom in a vertical direction. The lubricant dispenser 10 further includes a carrier 20 that holds a lubricant container 40, such as a grease cartridge, between a first support 21 and a second support 22. The second support 22 comprises or consists of a plate 23 (lower plate), which is guided by the guiding rods 12 and which slides thereon. Plate 23 may for example comprises respective recesses or through holes through which guiding rods 12 extend and which may be provided with slide bushings for allowing a smooth sliding on the rods 12.

The lubricant dispenser 10 is configured to receive cartridges of up to a predefined maximum size, e.g. up to a predefined maximum outer diameter. The plate 23 of the second support 22 has a size that is larger than this predefined maximum diameter, i.e. the full outer diameter and thus the outer shell of the lubricant container 40 is supported by the plate 23. The plate 23 can be provided with grooves, notches, ridges or the like so that cartridges having one or more predefined sizes, in particular outer diameters, can sit firmly and in a central position on the plate 23.

The lubricant dispenser 10 further includes a flow connection which is configured to be coupled at one end to the lubricant container 40 and which provides a flow of lubricant towards the lubricant reservoir 110 (FIG. 3) of the lubrication system 100. In the example of FIG. 2, the flow connection is provided in form of a conduit 15. Several configurations are conceivable for coupling conduit 15 to the lubricant container 40 and for providing the first support 21. For example, the end of the conduit 15 may comprise a flange and a sleeve nut or compression nut which is configured to be screwed onto a screw neck of the container 40. The screw neck of container 40 may thus abut against such flange and may be firmly secured thereto by the sleeve nut, so that a flow connection to conduit 15 is established and the container is firmly supported. In another implementation, the conduit 15 may have an internal thread into which the screw neck of the container is screwed, and the conduit 15 may not protrude from plate 11. The upper part of container 40 may then be supported against the plate 11.

Figure 4:
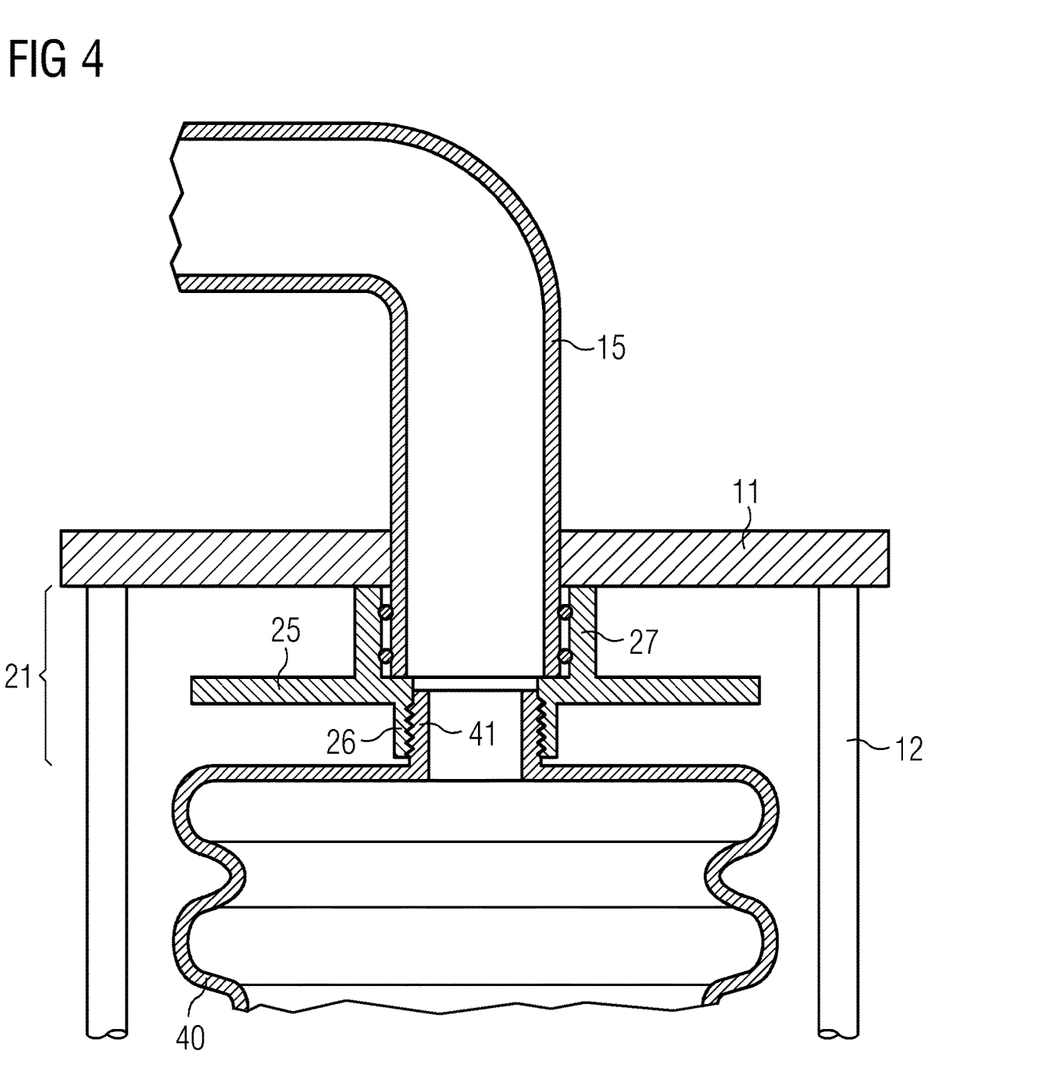
FIG. 4 is a schematic drawing showing the first support of a lubricant dispenser in accordance with an embodiment of the invention.

A further possible configuration is shown in FIG. 4. Support 21 is provided by an adapter piece 25, which may also be termed connector flange, and which can include a flange with a sleeve nut that is configured to be screwed onto the screw neck of the container 40. In the example of FIG. 4, it includes a portion 26 with an internal thread into which the screw neck 41 of container 40 is screwed. It further includes a cylindrical portion 27 which can be pushed over the end of the conduit 15 and which establishes a flow connection therewith. The cylindrical portion 27 may also include seals or the like (e.g. O-ring seals) so that a firm seat is achieved and lubricant is prevented from leaking through such connection. The adapter piece 25 further includes an annular flange which may provide an additional support for the walls of the container 40 when the container 40 is compressed towards the adapter piece 25. In the embodiment of FIG. 4, the first support 21 for the container 40 is provided both by the adapter piece 25 and plate 11 against which the adapter piece 25 is supported. As mentioned above, in other configurations, the first support 21 may only be provided by the upper plate 11 and/or the end of the conduit 15, or by other types of connectors and adapters. An advantage of using the adapter piece 25 of FIG. 4 is that the adapter piece 25 can be screwed onto the lubricant container 40 prior to insertion of the lubricant container 40 into the carrier 20.

It should be clear that another type of connection may be established between the adapter piece 25 and the conduit 15, for example a screw connection, or the cylinder portion 27 may extend into the conduit 15. It should further be clear that the annular flange of the adapter piece 25 is optional, and it may sufficient that the container 40 is supported at its neck 41.

Turning back to FIG. 2, the lubricant dispenser 10 comprises a squeeze mechanism 30 that in the embodiment of FIG. 2 includes a manual actuator. The manual actuator includes a lever arm 31 that is pivotably coupled to the frame of the lubricant dispenser 10. As shown, the lever arm 31 is fixed to the upper plate 11 (in particular to a protrusion thereof, such as a lug) at the pivot point 32. The lever arm 31 is coupled to the second support 22, in particular to the plate 23, via a linkage element 33. Linkage element 33 can be a short bar that is pivotably connected to the end of the lever arm 31 and that is at its other end pivotably connected to the plate 23 (pivot point 34). Linkage element 33 allows a decoupling of the arcuate motion of the end of lever arm 31 around pivot point 32 from the linear motion of the plate 23 along the guides 12. The plate 23 is provided with a tap or lug 36 to which the linkage element 33 is pivotably connected.

When the lever arm 31 is actuated manually in the direction indicated by the arrow, the resulting torque is translated into a linear motion of the second support 22, in particular plate 23, towards the first support 21, as indicated by the second arrow. As plate 23 approaches the first support 21, the container 40 disposed therebetween is squeezed, and the content of the container is discharged through the conduit 15. As can be seen, a single actuation or stroke of the lever arm 31 is sufficient to move the squeeze mechanism 20 from the extended state shown in FIG. 2 to a contracted state in which the container 40 is squeezed and compressed as much as possible. In the contracted position, the second support 22 is spaced from the first support 21 by less than half the distance which is present between the two supports in the extended state. The squeeze mechanism is configured such that with a single stroke or actuation of the manual actuator, the second support 22 can be brought into a position in which further manual movement is restricted by the lubricant container 40 compressed between the first and second supports.

It should be clear that the example of FIG. 2 shows only one possible configuration of a manual actuator, and that the linkages and the pivot points of such manual actuator can be configured differently, while the same result can still be achieved, i.e. the container 40 can be discharged with essentially one stroke or actuation. Furthermore, besides using a manual actuator, it is also possible to employ an electrical, hydraulic or pneumatic actuator, such as a hydraulic or pneumatic piston. The stroke length of such piston is then such that the container 40 can be fully discharged (i.e. the dischargeable amount of lubricant is discharged) by a single stroke of the respective piston. Such piston or an electric actuator may for example be mounted below the plate 23 and may push plate 23 upwards until the container 40 is compressed as much as possible and has released most of its content through conduit 15. Such actuator can also be coupled to the second support via a lever mechanism, similar to the one shown in FIG. 2. A manual actuator is preferred, as it reduces the complexity of the lubricant dispenser 10 and as no additional connections to a hydraulic, electric or pneumatic power supply are required.

Conduit 15 can be provided by a tube or pipe or other conduit suitable for conducting grease or other lubricant from the container 40 to the lubricant reservoir. Conduit 15 extends downwardly through the plate 11, so that its opening is disposed below the plate 11. Accordingly, the opening of conduit 15 is protected from dirt and dust, which may fall from above onto the lubricant dispenser 10. By arranging the inlet to the lubricant reservoir underneath the top plate 11, a cleaner lubrication system can be achieved and it can be prevented that dirt particles damage the main bearing or any other bearing lubricated by the system. It should be clear that the opening into conduit 15 may additionally be protected by a cap when no container 40 is present.

Figure 3:
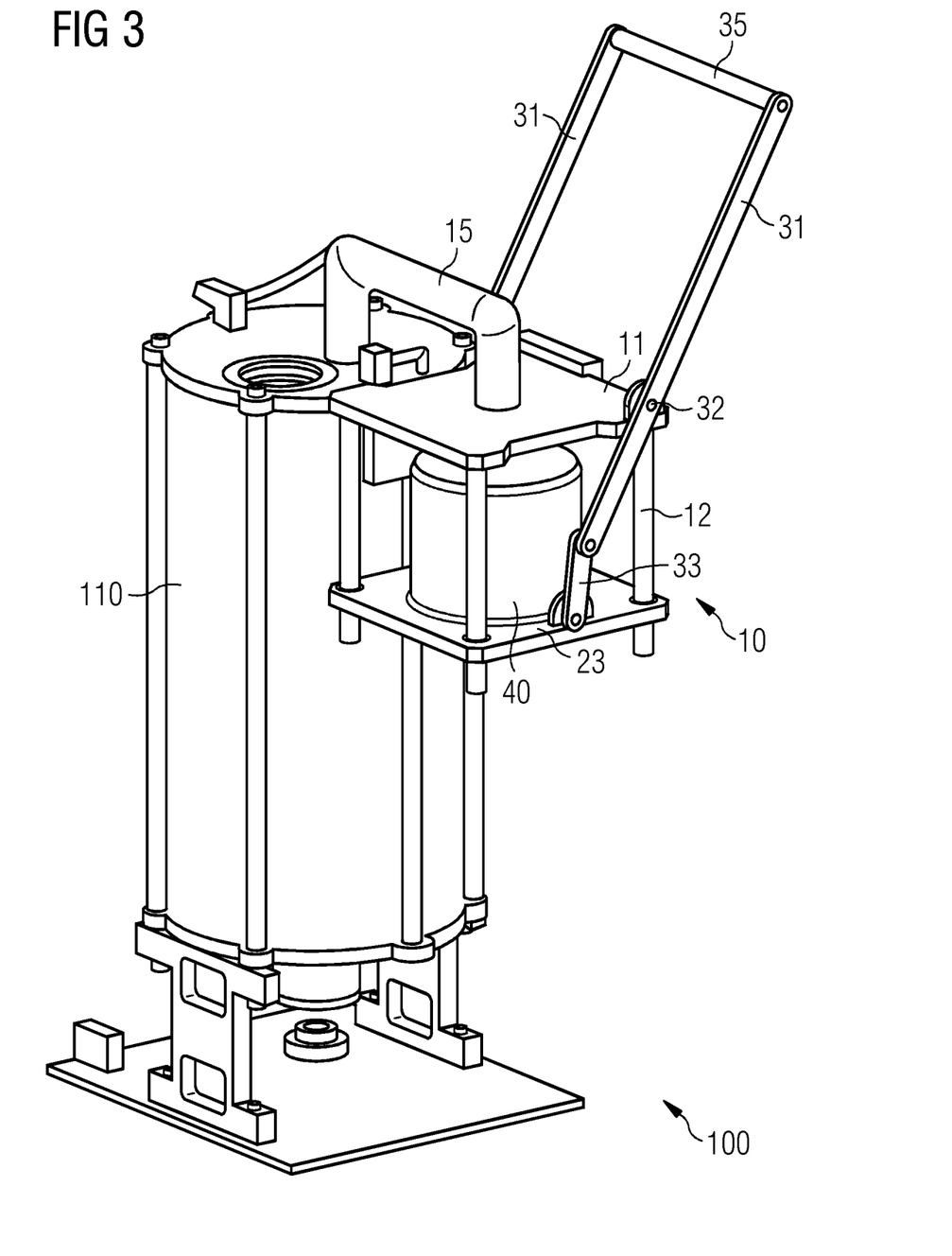
FIG. 3 is a schematic drawing showing a wind turbine lubrication system in accordance with an embodiment of the invention.

FIG. 3 shows a wind turbine lubrication system 100 that includes a lubricant reservoir 110 and the lubricant dispenser 10 of FIG. 2. The above explanations are thus equally applicable to the embodiment of FIG. 3. In FIG. 3, the lubricant container 40 is shown as a cylindrical cartridge, yet it should be clear that a bellows cartridge may be used as well. The top plate 11 and the plate 23 of the second support 22 have a rectangular or square shape, and it should be clear that any other shape, such as a circular or an oval shape may be used as well. The lubricant dispenser 10 includes two lever arms 31 on opposite sides of the dispenser. The remote ends of the lever arms 31 are connected by a handle 35. By pulling the handle 35, a significant compressive force can thus be applied to the lubricant container 40.

The lubricant dispenser 10 is permanently mounted to the lubricant reservoir 110, i.e. it is permanently disposed in nacelle 201 of the wind turbine 200. Installation is simple and cost efficient, since the lubricant dispenser 10 does not require any additional connections and has a low complexity. Lubricant dispenser 10 can be mounted to the reservoir 110 by means of a screw connection, bolts, a clamped connection, or it may even be welded to the reservoir 110. The lubricant dispenser is mounted to the side (in particular to the upper half) or to the top of the lubricant reservoir 110. By mounting the lubricant dispenser 10 in such a way, the chance that dirt from the floor of the nacelle reaches the lubricant is significantly reduced. Contamination of the lubricant and thus failure of a bearing, such as the main bearing, can thereby be prevented.

In other configurations, the lubricant dispenser can be mounted to a lubricant pump (not shown) which may for example be disposed below or besides the lubricant reservoir 110. The lubricant pump pumps the lubricant from the reservoir to the wind turbine component to be lubricated or greased, such as the pitch bearing, main bearing, yaw bearing, or other component, e.g. gear or rack and pinion arrangements or the like. The lubricant pump can supply the lubricant to one or to plural wind turbine components. Separate lubrication systems are provided in the nacelle and the rotor of the wind turbine.

The lubricant dispenser may also be disposed upside down, i.e. such that the plate 11 is a lower plate from which the guiding rods 12 extend upwards. The opening of the lubricant container 40 is then facing downwards when the lubricant container is inserted. Discharging of the lubricant may thereby be facilitated. Further, such lubricant dispenser can be mounted or arranged directly above the inlet opening into the reservoir 110 (i.e. above the position at which the conduit 15 is connected to the reservoir 110 in FIG. 3). The flow connection can then be provided from lubricant container 40 directly through the plate 11 into the reservoir 110, i.e. without employing a conduit, such as a pipe or tube. Plate 11 may for example connect directly or via a connector or adapter piece to the inlet opening of the reservoir (e.g., a screw neck of the inlet may be screwed into the opening in plate 11). The lubricant container can also be connected directly to such opening in plate 11 (e.g. by screwing the screw neck 41 of the container 40 into the opening) or via a connector or adapter piece, as described above. By actuation of the squeeze mechanism 30, the Lubricant can then be discharged directly and with minimal flow resistance into the reservoir 110.

The lubricant dispenser 10 may also be provided as a separate component that is portable. The lubricant dispenser may then be fluidically connected to the lubricant reservoir or the lubricant pump by a service technician prior to refilling the respective reservoir.

Figure 5:
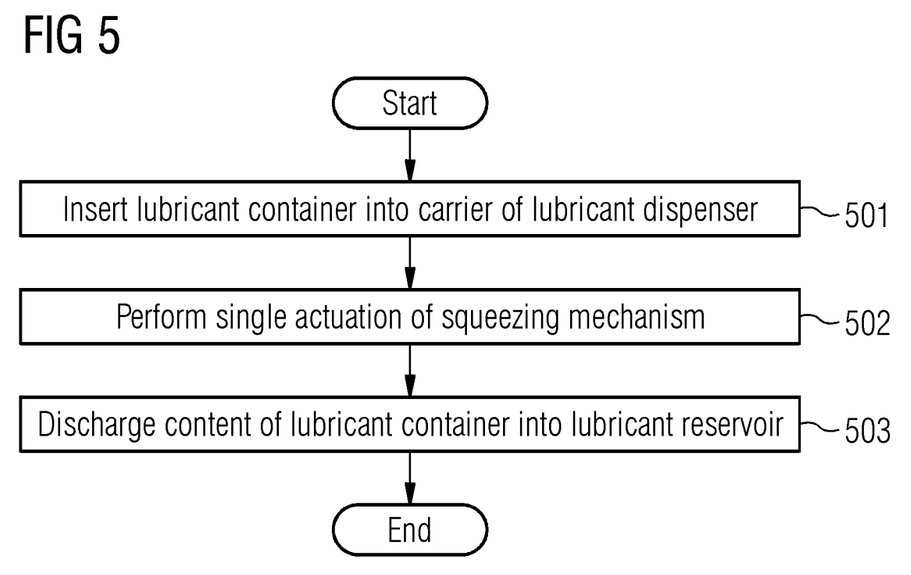
FIG. 5 is a flow diagram that illustrates a method according to an embodiment of the invention.

FIG. 5 is a flow diagram illustrating a method of refilling the lubricant reservoir 110 of the wind turbine 200. In step 501, the lubricant container 40, such as a bellows grease cartridge, is inserted into the carrier 20 of the lubricant dispenser 10. The service technician then performs a single actuation of the squeeze mechanism 30, in particular of the lever arm 31 (step 502). The actuation causes the discharge of the lubricant contained in the lubricant container 40 into the lubricant reservoir 110 (step 503).

As can be seen, discharging the lubricant comprised in the lubricant container into the lubricant reservoir 110 is fast and efficient. The steps can then be repeated for the next lubricant container, i.e. the next grease cartridge can be inserted into the lubricant dispenser 10. In conventional systems, the refilling of the main bearing lubricant reservoir generally requires three or four hours of working time of the service technician. With the lubricant dispenser and the lubrication system described herein, the refilling of the lubricant reservoir 110 can be performed by a service technician in less than 30 minutes. This high efficiency results in significant cost savings. In particular for offshore wind turbines, it is very cost intensive if service technicians spend long periods of time on a single wind turbine. Furthermore, the prolonged time that the service vessel has to stay with the wind turbine also significantly increases costs.

The refilling of the reservoir of the lubrication system provided by the present solution is not only more efficient, but also cleaner and avoids that lubricant is contaminated by dirt particles. The inlet for the lubricant is hidden under the top plate of the lubricant dispenser 10, and the mounting position of the lubricant dispenser 10 further avoids pollution with dirt from the floor of the nacelle. Bearing failures due to pollution of lubricant can thereby be prevented. Embodiments of the present invention therefore provide efficient means for reducing the required service time and for preventing contamination of lubricant in the reservoir with dirt particles.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A lubricant dispenser for filling a lubricant reservoir of a wind turbine, comprising:
    a carrier configured to receive a lubricant container, wherein the carrier comprises at least a first support for supporting one end of the lubricant container and a second support for supporting a second end of the lubricant container;
    a flow connection having a first end configured to be coupled to the lubricant container and a second end configured to be coupled to the lubricant reservoir; and
    a squeeze mechanism that is mechanically coupled to the second support and that is actuatable to move the second support towards the first support such that a lubricant container disposed between the first and second supports is squeezed so that the content of the lubricant container is discharged through the flow connection, wherein the squeeze mechanism comprises a manual actuator configured to effect the movement of the second support, wherein the manual actuator includes a lever arm that has a first end for actuation and a second end coupled to the second support, the lever arm being pivotably coupled to a frame of the lubricant dispenser at a pivot point, wherein the pivot point is closer to the second end than to the first end of the lever arm.

2. The lubricant dispenser of claim 1, wherein the squeeze mechanism comprises an extended state in which the second support is spaced apart by a predetermined distance from the first support to allow the insertion of the lubricant container, and comprises a contracted state in which the second support is spaced apart from the first support by less than half the predetermined distance, wherein the squeeze mechanism is configured to bring the second support from the extended state to the contracted state with a single stroke of the respective actuator.

3. The lubricant dispenser of claim 1, wherein the second end of the lever arm is connected to the second support by a linkage element that is pivotably coupled to the second end of the lever arm and to the second support.

4. The lubricant dispenser of claim 1, wherein the squeeze mechanism comprises two of the lever arms coupled to opposite sides of the second support, wherein the first ends of the two lever arms are interconnected by a handle.

5. The lubricant dispenser of claim 1, wherein the second support is a plate configured to support an outer shell of the lubricant container such that when the lubricant container is squeezed by movement of the second support, the outer shell of the lubricant container is squeezed.

6. The lubricant dispenser of claim 1, wherein the first support comprises an end of the flow connection and a connector configured to connect an opening of the lubricant container to the end of the flow connection, or an adaptor piece configured to be connected to the lubricant container and to be coupled to the flow connection.

7. A wind turbine lubrication system, comprising:
    a lubricant reservoir for storing lubricant, the reservoir being configured to be disposed in a nacelle of the wind turbine;
    a lubricant dispenser according to claim 1, wherein the lubricant dispenser is mounted in a fixed spatial relationship to the lubricant reservoir.

8. The wind turbine lubrication system of claim 7, wherein the lubricant reservoir is the lubricant reservoir of a wind turbine main bearing lubrication system, of a wind turbine blade pitch bearing lubrication system, or of a yaw bearing lubrication system.

9. The wind turbine lubrication system of claim 7, further comprising a lubricant container, wherein the lubricant container is a bellows shaped cartridge having a bellows shaped outer shell, wherein the squeeze mechanism is configured to squeeze together the outer shell of the lubricant container.

10. A wind turbine comprising the lubrication system according to claim 7.

11. A method of refilling a wind turbine lubricant reservoir, comprising:
    disposing a lubricant container in the carrier of the lubricant dispenser of claim 1; and
    actuating the squeeze mechanism of the lubricant dispenser to discharge the content of the lubricant container through the flow connection into the lubricant reservoir.

12. A lubricant dispenser for filling a lubricant reservoir of a wind turbine, comprising:
    a carrier configured to receive a lubricant container, wherein the carrier comprises at least a first support for supporting one end of the lubricant container and a second support for supporting a second end of the lubricant container;
    a flow connection having a first end configured to be coupled to the lubricant container and a second end configured to be coupled to the lubricant reservoir; and
    a squeeze mechanism that is mechanically coupled to the second support and that is actuatable to move the second support towards the first support such that a lubricant container disposed between the first and second supports is squeezed so that the content of the lubricant container is discharged through the flow connection,
    wherein the lubricant dispenser has two or more guiding rods, wherein the second support has cutouts through which the guiding rods extend, wherein movement of the second support is guided by the guiding rods.

13. A lubricant dispenser for filling a lubricant reservoir of a wind turbine, comprising:
    a carrier configured to receive a lubricant container, wherein the carrier comprises at least a first support for supporting one end of the lubricant container and a second support for supporting a second end of the lubricant container;
    a flow connection having a first end configured to be coupled to the lubricant container and a second end configured to be coupled to the lubricant reservoir; and
    a squeeze mechanism that is mechanically coupled to the second support and that is actuatable to move the second support towards the first support such that a lubricant container disposed between the first and second supports is squeezed so that the content of the lubricant container is discharged through the flow connection, wherein the lubricant dispenser comprises a frame including an upper plate and two or more downwardly extending guiding rods, the first support forming part of the upper plate or being supported by the upper plate, wherein the flow connection is led through the upper plate such that the end of the flow connection that is to be coupled to the lubricant container is disposed below the upper plate, wherein movement of the second support is guided by the guiding rods.

14. A lubricant dispenser for filling a lubricant reservoir of a wind turbine, comprising:

a carrier configured to receive a lubricant container, wherein the carrier comprises at least a first support for supporting one end of the lubricant container and a second support for supporting a second end of the lubricant container;

a flow connection having a first end configured to be coupled to the lubricant container and a second end configured to be coupled to the lubricant reservoir; and a squeeze mechanism that is mechanically coupled to the second support and that is actuatable to move the second support towards the first support such that a lubricant container disposed between the first and second supports is squeezed so that the content of the lubricant container is discharged through the flow connection, wherein the squeeze mechanism comprises an electric actuator, a hydraulic actuator or a pneumatic actuator which is configured to effect the movement of the second support.

15. The lubricant dispenser of claim 14, wherein the squeeze mechanism comprises the electric actuator.

16. The lubricant dispenser of claim 14, wherein the squeeze mechanism comprises the hydraulic actuator.

17. The lubricant dispenser of claim 14, wherein the squeeze mechanism comprises the pneumatic actuator.

* * * * *